2,935,499
REMOVAL OF RESIDUAL CATALYST FROM POLYOLEFINS

Denton M. Albright, Drexel Hill, and Robert W. Shinn, Swarthmore, Pa., assignors to Sun Oil Company, Philadelphia, Pa., a corporation of New Jersey No Drawing. Application August 6, 1957
Serial No. 676,511

1 Claim. (Cl. 260—93.7)

This invention relates to the removal of metallic contaminants from polyolefins, and more particularly to the removal of catalyst-derived metallic contaminants from polyolefins, the formation of which has been catalyzed by a Ziegler catalyst.

In the polymerization of alpha olefins by the Ziegler technique, the olefin to be polymerized is dissolved in an inert hydrocarbon such as heptane or isooctane, and is contacted with a complex formed by the reaction of a halide of a metal of groups IV, V or VI with an activator which acts as a strong reducing agent, such as alkyl derivatives of aluminum, zinc, beryllium, chromium, magnesium, sodium, potassium, and lithium. Aluminum triethyl, aluminum triisobutyl, and the magnesium and zinc analogues are preferred, but metal alkyls containing up to about 12 carbon atoms in the alkyl groups can be used with good results. One or more of the alkyl groups may be replaced with a halogen. While the metal halide activated by the activator is preferably titanium trichloride, halides of zirconium, hafnium, vanadium, niobium, chromium, molybdenum or tungsten may also be used. The catalyst complex should be present in the reaction mixture in an amount of from about 0.001% to about 0.25% by weight, preferably about 0.1%. Desirably, metal alkyl should be present in an amount somewhat above that required to form the catalyst.

At the conclusion of the polymerization reaction, which is preferably carried out at a temperature in the vicinity of 90° C., the reaction is treated with a catalyst deactivator such as an alcohol or acetone in order to destroy the complex, which is pyrophoric on contact with air, and the solid polymer is separated from the solvent and washed with an aqueous or alcoholic acid solution in order to remove as much of the catalyst residue as possible, since inclusion of metal compounds in the finished polymer adversely affects the dielectric qualities of the polymer. In addition, it is believed these metallic impurities may possibly catalyze oxidative degradation of the polymer. It has been found that while the bulk of the contaminants may be removed from the polymer by the foregoing procedure, it is impossible to obtain a polymer essentially free of contaminants, since apparently some of the contaminants are occluded by the polymer in a manner such that the acid solution cannot reach the contaminants in order to dissolve them.

In accordance with the present invention we have now found that polyolefins produced by the Ziegler technique may be essentially freed of metallic contaminants by percolating the polymer, either in solution in a hydrocarbon solvent such as decahydronaphthalene or isooctane, or in melted form, through a bed of asbestos. The percolation step is equally effective either before or after the deactivation steps, so that when proceeding according to the present process not only may these two steps be omitted, with consequent savings in operating costs, but a further step heretofore considered necessary, that of freeing solvent from dectivator, may also be omitted. Asbestos appears to be unique in its ability to so separate the metallic contaminants, since other materials commonly used as filter aids or adsorbents, such as Celite, bentonite clay, Attapulgus clay and silica gel, are either ineffective to remove the contaminants, or impart additional contamination to the polymer.

As examples of the efficacy of asbestos in removal of metallic contaminants from polyolefins the following examples are given:

EXAMPLE I

A sample of polypropylene which has previously been acid treated was dissolved in decalin to yield 65 ml. of a 5% polypropylene solution. This solution contained .80 mg. of titanium, .10 mg. of aluminum, and .10 mg. of iron. The solution was then passed through a section cut from an asbestos wire gauze, supported on filter paper. No trace of titanium, aluminum, or iron could be found in the filtrate, so that the polymer recovered was essentially contaminant-free.

EXAMPLE II

In this test a solution of polypropylene in isooctane was taken directly from a polymerization reactor, and was filtered through a bed of Tremolite asbestos, of the type used in filtration through Gooch crucibles, supported on filter paper, without prior treatment to deactivate the catalyst. The charge to the filtration contained 0.031% titanium, 1.13% aluminum, 0.03% iron, and 0.005% magnesium, all percentages being by weight. The filtrate contained 0.005 percent iron, and was completely free of titanium, aluminum or magnesium, demonstrating that essentially complete removal of contaminants was obtained by filtration through asbestos, even though the extent of contamination was much higher than in the solution used for Example I.

Other tests were conducted to determine whether other materials commonly used as filter aids or adsorbents would prove effective in removing metallic contaminants from 5% solution of polypropylene (previously acid treated) in decahydronaphthalene. Results of these tests are given in the following table. All of the filtering media were supported on Baroid #725 filter paper.

*Table 1*

| Filter Medium | Milligrams of Trace Metal Contaminants | | | | | | Solution Volume, ml. |
|---|---|---|---|---|---|---|---|
| | Charge | | | Filtrate | | | |
| | Ti | Al | Fe | Ti | Al | Fe | |
| Baroid #725 Filter Paper | .32 | .10 | | .32 | .17 | | 80 |
| Celite | .13 | .08 | .18 | .10 | .16 | .30 | 65 |
| Bentonite Clay | .13 | .08 | .18 | .08 | .14 | .25 | 62 |
| Attapulgus Clay | .60 | .15 | .10 | .50 | 3.2 | .40 | 44 |
| Silica Gel | .37 | .19 | .28 | .36 | .12 | .24 | 70 |

As may be seen from the foregoing, in the case of Celite, bentonite clay and Attapulgus clay, the total contamination was increased, rather than decreased, markedly so in the case of Attapulgus clay. In the case of silica gel, the total contamination decreased slightly, but not enough to yield a clean polymer. In the case of filter paper alone, no significant change in contaminant concentration was noted.

While the foregoing examples have been directed to the removal of contaminants from polymer solutions, essentially the same results may be obtained by forcing molten polymer through asbestos. Since the polymer is quite viscous, excessively high pressures must be used to force the polymer through the asbestos, and for this reason we prefer to use solutions in our process. Also, while the examples have been directed to the decontamination of polypropylene, the same results may be obtained in the decontamination of polyethylene and polybutene-1 prepared according to the Ziegler technique. Furthermore, while the foregoing description has been directed primarily to removal of residual catalyst components from polyolefins produced according to the Ziegler technique, the present process is equally effective to remove metallic contaminants from polyolefins regardless of the source of the contamination.

The invention claimed is:

A process for removing metallic contaminants from polypropylene which comprises dissolving polypropylene in a hydrocarbon solvent, said polypropylene containing metallic contaminants resulting from its preparation by contacting propylene with a titanium chloride-aluminum trialkyl coordination complex catalyst, passing the solution through a bed of asbestos, and recovering as a percolate a polypropylene solution essentially free of metallic contaminants.

References Cited in the file of this patent

UNITED STATES PATENTS

| 665,925 | Nordtmeyer | Jan 15, 1901 |
| 1,336,591 | Washburn | Apr. 13, 1920 |
| 2,731,453 | Field et al. | Jan. 17, 1956 |